United States Patent
Ota et al.

(10) Patent No.: US 6,228,339 B1
(45) Date of Patent: May 8, 2001

(54) PROCESS FOR PRODUCING HYDROXYAPATITE FIBERS

(75) Inventors: Yoshio Ota; Tetsushi Iwashita, both of Ogaki; Toshihiro Kasuga, Aichi-Ken; Yoshihiro Abe, Nisshin, all of (JP)

(73) Assignee: Yabashi Industries Co., Ltd., Ogaki (JP)

( * ) Notice: Subject to any disclaimer, the term of this patent is extended or adjusted under 35 U.S.C. 154(b) by 0 days.

(21) Appl. No.: 09/187,726

(22) Filed: Nov. 6, 1998

(51) Int. Cl.[7] ........................................ C01B 25/26

(52) U.S. Cl. ................................. 423/308; 423/311

(58) Field of Search ............................ 423/308, 311, 423/314

(56) References Cited

U.S. PATENT DOCUMENTS 4,360,625 * 11/1982 Griffith ............................ 423/314
5,227,147 * 7/1993 Yoshimura et al. .............. 423/308

FOREIGN PATENT DOCUMENTS 53-111000 * 9/1978 (JP).

* cited by examiner

*Primary Examiner*—Wayne Langel
(74) *Attorney, Agent, or Firm*—Winston & Strawn; L. Boyadjian

(57) ABSTRACT

A process for producing hydroxyapatite fibers is disclosed. The process comprises the steps of preparing a mixture of (1) calcium metaphosphate fibers and (2) calcium oxide, calcium hydroxide and/or calcium carbonate powder; heating the mixture to convert the calcium metaphosphate to hydroxyapatite; and removing calcium oxide in the heat-treated mixture by dissolving off from the resulting mixture.

6 Claims, 4 Drawing Sheets

PROCESS FOR PRODUCING HYDROXYAPATITE FIBERS

BACKGROUND OF THE INVENTION

I. Field of the Invention

The present invention relates to a process for producing hydroxyapatite fibers.

II. Description of the Related Art

Hydroxyapatite is the major inorganic component constituting hard tissues such as bones and teeth, and is one of the materials having excellent bio-compatibility. Therefore, hydroxyapatite is used as materials for artificial dental root and bone prosthesis, and plays an important role in the field of biological materials. In addition, research and development of hydroxyapatite for use in industrial fields as absorbents of chromatography, ion-exchangers, sensors, catalysts and the like are also now widely made.

Thus, applications of hydroxyapatite to various uses are expected. Since the performance of hydroxyapatite is largely influenced by the shape of the hydroxyapatite particles, it is thought that control of the shape of the hydroxyapatite particles is necessary. For example, in the field of biological materials, hydroxyapatite is demanded to have high strength, high toughness and low modulus of elasticity. In general, mechanical properties of ceramics and high polymers are effectively improved by incorporating a material in the form of needles or fibers. Especially, in cases where a material is used as a biological material, the material preferably has bio-compatibility and is in the form of atoxic needles or fibers. Therefore, it has been intensively studied to obtain hydroxyapatite having bio-compatibility and is in the form of atoxic needles or fibers. As a result, needle-shaped or fiber-shaped hydroxyapatite, Ca-deficient hydroxyapatite and $CO_3$-containing hydroxyapatite have been synthesized by various methods such as hydrothermal synthesis method, reflux method, agar gel method, alginate-spinning method and the like.

A process for producing needle-shaped or fiber-shaped hydroxyapatite, which is simpler than the known methods is demanded.

SUMMARY OF THE INVENTION

Accordingly, an object of the present invention is to provide a process for producing hydroxyapatite fibers, which is simpler than the known processes.

The present inventors intensively studied to discover that calcium metaphosphate fibers may be converted to hydroxyapatite fibers by reacting the calcium metaphosphate with calcium oxide and water, thereby completing the present invention.

That is, the present invention provides a process for producing hydroxyapatite fibers comprising the steps of preparing a mixture of (1) calcium metaphosphate fibers and (2) calcium oxide, calcium hydroxide and/or calcium carbonate powder; heating the mixture to convert the calcium metaphosphate to hydroxyapatite; and removing calcium oxide in the heat-treated mixture by dissolving off from the resulting mixture.

By the process of the present invention, calcium metaphosphate fibers having high aspect ratio may be easily converted to hydroxyapatite fibers. Since the fibers are atoxic and have excellent bio-compatibility, novel applications of hydroxyapatite to, for example, composite materials with bio-compatible polymers are expected. Further, since the hydroxyapatite is in the form of needles or fibers having high safety to the body, various uses thereof in various industrial fields are expected.

DESCRIPTION OF THE PREFERRED EMBODIMENTS

Figure 1:
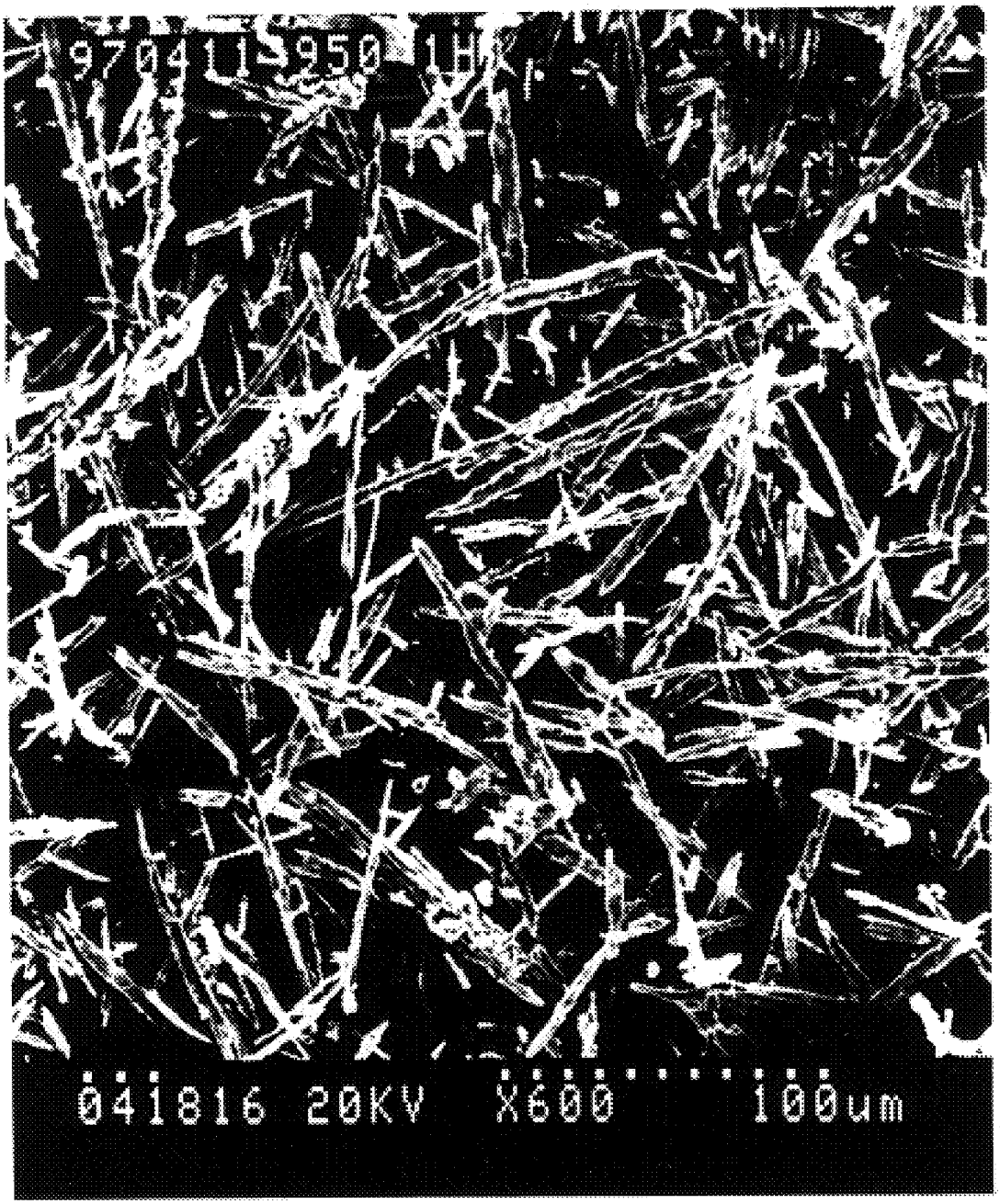
FIG. 1 is a SEM photograph of hydroxyapatite fibers (Sample No. 1) obtained in Example 1.

As mentioned above, in the process of the present invention, calcium metaphosphate ($\beta$-$Ca(PO_3)_2$) fibers and (2) calcium oxide (CaO) powder, calcium hydroxide ($Ca(OH)_2$) powder and/or calcium carbonate ($CaCO_3$) powder are used.

In the present specification and claims, the term "fiber" means not only fiber but also needle, of which aspect ratio is typically 3 to 100. Typically, $\beta$-$Ca(PO_3)_2$ fibers with diameters of 2 to 15 $\mu$m and lengths of 40 to 200 $\mu$m may preferably be used.

The $\beta$-$Ca(PO_3)_2$ fibers may easily be produced by a known method described in, for example, Japanese Patent No. 2649755 (Japanese Laid-open Patent Application (Kokai) No. 6-172100). That is, calcium phosphate glass ($46CaO.54P_2O_5$) is produced from $CaCO_3$ and $H_3PO_4$. The glass is heated at 600° C. for about 30 hours for its crystallization. The resultant product comprises fibrous $\beta$-$Ca(PO_3)_2$ as a major phase. $\beta$-$Ca(PO_3)_2$ fibers are extracted from the crystallized products by aqueous leaching (about 80° C.). Since the hydroxyapatite fibers produced by the process of the present invention reflect the shape of the $\beta$-$Ca(PO_3)_2$ fibers used as starting materials, it is preferred to use long $\beta$-$Ca(PO_3)_2$ fibers obtained by wet sieve classification. The $\beta$-$Ca(PO_3)_2$ fibers obtained by the wet sieve classification may preferably have the diameters of 2–15 $\mu$m and lengths of 40–200 $\mu$m. By using such $\beta$-$Ca(PO_3)_2$ fibers, hydroxyapatite fibers having the diameters of 2–15 $\mu$m and lengths of 40–200 $\mu$m can be obtained.

Another starting material, CaO, $Ca(OH)_2$ and/or $CaCO_3$ is in the form of powder of which particle size may preferably be not more than 3 $\mu$m. The smaller the particle size of the CaO, $Ca(OH)_2$ and/or $CaCO_3$ powder, the number of sites of the $\beta$-$Ca(PO_3)_2$ fibers which contact the powder is increased, so that it is preferred.

The mixture of the $\beta$-$Ca(PO_3)_2$ fibers and CaO, $Ca(OH)_2$ and/or $CaCO_3$ powder may preferably be prepared in wet condition. That is, to aqueous suspension of the $\beta$-$Ca(PO_3)_2$ fibers dispersed therein, CaO, $Ca(OH)_2$ and/or $CaCO_3$ powder is added to prepare aqueous suspension of $\beta$-$Ca(PO_3)_2$ fibers and $Ca(OH)_2$, or aqueous suspension of $\beta$-$Ca(PO_3)_2$ fibers and $CaCO_3$. It is preferred to stir the suspension during addition of the powder by ultrasonic treatment or any other stirrer so that the $\beta$-$Ca(PO_3)_2$ fibers and $Ca(OH)_2$ and/or $CaCO_3$ powder are appropriately dispersed in water To assure that the each of the $\beta$-$Ca(PO_3)_2$ fibers is surrounded by $Ca(OH)_2$ particles and/or $CaCO_3$ particles without contacting other $\beta$-$Ca(PO_3)_2$ fibers, the amount of the CaO, $Ca(OH)_2$ and/or $CaCO_3$ (hereinafter also referred to as "CaO or the like") may preferably be not less than 1 part by weight, more preferably 2–4 parts by weight, most preferably about 3 parts by weight in terms of CaO, per 1 part by weight of β-Ca(PO$_3$)$_2$ fibers. If the amount of the added CaO or the like is too small, the number of the sites at which β-Ca(PO$_3$)$_2$ fibers contact each other is large, and if such a mixture is heated as described below, β-Ca(PO$_3$)$_2$ fibers are adhered to each other, so that separate hydroxyapatite fibers may not be obtained easily. On the other hand, if the amount of the added CaO or the like is too large, each of the β-Ca(PO$_3$)$_2$ fibers are buried in the CaO particles, so that β-Ca(PO$_3$)$_2$ fibers free from CaO may not easily be obtained.

The above-described aqueous suspension may preferably be filtered under suction to obtain a cake, which may be then dried. The dried cake is a solid dispersion in which the β-Ca(PO$_3$)$_2$ fibers are dispersed in Ca(OH)$_2$ and/or CaCO$_3$ particles, which cake is a preferred embodiment of the mixture of the β-Ca(PO$_3$)$_2$ fibers and CaO or the like powder. The shape of the cake, which is usually in the form of a disk, is not important in the present invention at all, and any shape is acceptable.

The mixture in which the β-Ca(PO$_3$)$_2$ fibers are dispersed in Ca(OH)$_2$ and/or CaCO$_3$ particles, may easily be obtained by other methods, such as dry press molding.

The thus obtained mixture is then heated. The heat treatment may preferably be carried out in the air at 800–1200° C. for not less than 1 hour, more preferably at about 1000° C. for about 1 hour. By this treatment, the β-Ca(PO$_3$)$_2$ and CaO are reacted so as to generate hydroxyapatite.

The mechanism of the reaction during the heat treatment is thought as follows. That is, the mixture before the heat treatment is a dispersion of β-Ca(PO$_3$)$_2$ fibers surrounded by Ca(OH)$_2$ or CaCO$_3$ particles. At this stage, Ca/P ratio in the β-Ca(PO$_3$)$_2$ is 0.5. Upon heating the mixture, initially, Ca(OH)$_2$ or CaCO$_3$ is changed to CaO. By further heating the mixture, β-Ca(PO$_3$)$_2$, CaO and water in the atmosphere are reacted at the surfaces of the β-Ca(PO$_3$)$_2$ fibers, and a Ca-rich phase of hydroxyapatite is generated near the surfaces of the β-Ca(PO$_3$)$_2$ fibers. This phase gradually penetrates into the inner portions of the fibers, and finally, the entire fibers are converted to hydroxyapatite (Ca$_{10}$(PO$_4$)$_6$(OH)$_2$(HAP), Ca/P=1.67). Thus, the obtained hydroxyapatite fibers substantially retains the original shape of the β-Ca(PO$_3$)$_2$ fibers.

Since the heat-treated mixture contains hydroxyapatite fibers and CaO, the CaO remaining in the heat-treated mixture is then removed by dissolving off the CaO. This may be carried out by, for example, immersing the mixture in sufficiently amount of water, after allowing the mixture to cool to about room temperature. By this operation, the CaO in the heat-treated mixture is converted to Ca(OH)$_2$ by the reaction with water, so that CaO is gradually dissolved. To accelerate the dissolution, it is preferred to slowly add a reagent for dissolving calcium hydroxide, such as hydrochloric acid, acetic acid, nitric acid and ammonium chloride. Such a reagent may preferably be added until the aqueous solution is neutralized. Alternatively, the heat-treated mixture may be immersed in aqueous solution of the reagent mentioned above. The amount of the reagent in either case may be roughly calculated because the amount of the CaO to be dissolved off may roughly be calculated. By this treatment, the CaO is dissolved off and pure hydroxyapatite fibers are left. The obtained hydroxyapatite fibers may be recovered by, for example, filtration, and then may be washed with water and dried.

By the above-described process according to the present invention, hydroxyapatite fibers typically having the diameters of 2 to 15 μm and lengths of 40 to 200 μm may be obtained.

The invention will now be described by way of examples thereof. It should be noted that the examples are presented for the illustration purpose only and should not be interpreted in any restrictive way.

EXAMPLE 1

In 0.15 L of distilled water at room temperature, 5.0 g of β-Ca(PO$_3$)$_2$ fibers were ultrasonically dispersed. To this aqueous dispersion, 15.0 g of calcium oxide (CaO) powder (particle diameter of not more than about 250 μm) was added. The β-Ca(PO$_3$)$_2$ fibers were produced by the method described in Japanese Patent No. 2649755 (Japanese Laid-open Patent Application (Kokai) No. 6-172100). That is, calcium phosphate glass (46CaO.54P$_2$O$_5$) was produced from CaCO$_3$ and H$_3$PO$_4$. The glass was heated at 600° C. for about 30 hours for its crystallization. The resultant product comprised fibrous β-Ca(PO$_3$)$_2$ as a major phase. β-Ca(PO$_3$)$_2$ fibers were extracted from the crystallized products by aqueous leaching (about 80° C.). The obtained β-Ca(PO$_3$)$_2$ fibers were wet-sieved to obtain longer fibers having diameters of 2 to 15 μm and lengths of 40 to 200 μm. After adding the above-mentioned CaO powder, the mixture was continued to be ultrasonically treated for another 10 minutes. The resulting suspension was filtered with suction. The resulting filter cake was dried at 105° C. for 3 hours to obtain a disk-shaped dried mixture. The disk-shaped mixture was then heated in the air at 950° C. for 1 hour. The resulting mixture was then allowed to cool to about room temperature and then immersed in 0.8 L of distilled water at room temperature. To accelerate the dissolution of Ca(OH)$_2$, 4 mol/l hydrochloric acid was added under stirring until the aqueous solution is neutralized. The residue was recovered by filtration, washed with water, dried at 105° C. for 3 hours to obtain hydroxyapatite fibers (Sample No. 1) having diameters of 2 to 15 μm and lengths of 40 to 200 μm.

Figure 2:
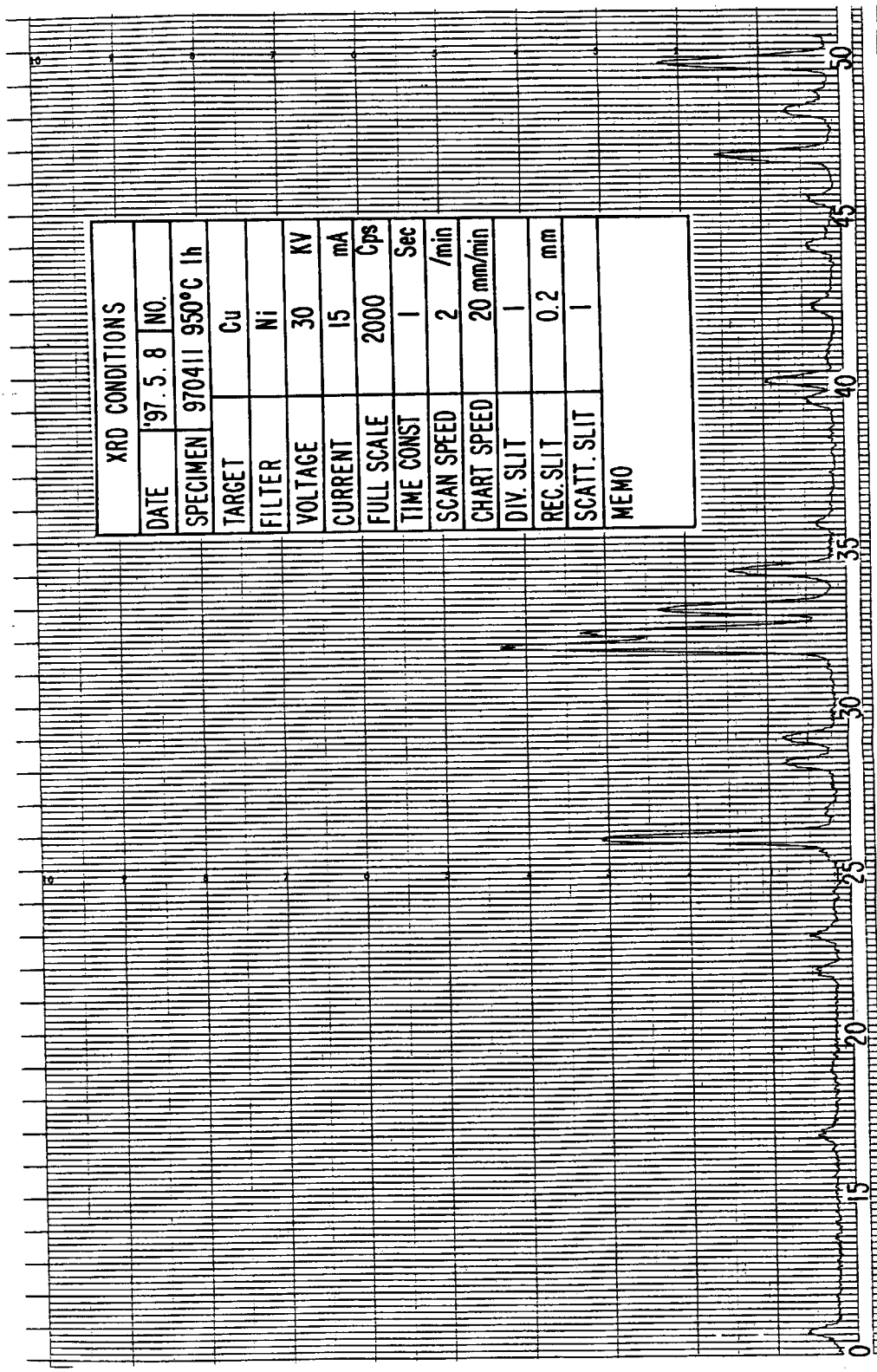
FIG. 2 is an X-ray diffraction pattern of hydroxyapatite fibers (Sample No. 1) obtained in Example 1.

FIG. 1 shows a SEM photograph of Sample No. 1, which indicates that the obtained hydroxyapatite is in the form of fibers. FIG. 2 shows the X-ray diffraction pattern of Sample No. 1, which indicates that the fibers are made of hydroxyapatite. The measuring conditions of the X-ray diffraction were as follows (the conditions were also employed in Example 2 described below).
Vessel: Cu
Filter: Ni
Voltage: 30 kV
Current: 15 mA
Scanning Speed: 2°/min.
Slit Width: DS 1°, RS 0.2 mm, SS 1°

EXAMPLE 2

The same procedure as in Example 1 was repeated except that 27.0 g of calcium carbonate (CaCO$_3$) powder (equivalent to about 15 g of CaO) (diameter 2–3 μm) was used in place of 15.0 g of CaO powder, and that the heat treatment was carried out at 1100° C. for 1 hour, to obtain Sample No. 2.

Figure 3:
FIG. 3 is a SEM photograph of hydroxyapatite fibers (Sample No. 1) obtained in Example 2.
Figure 4:
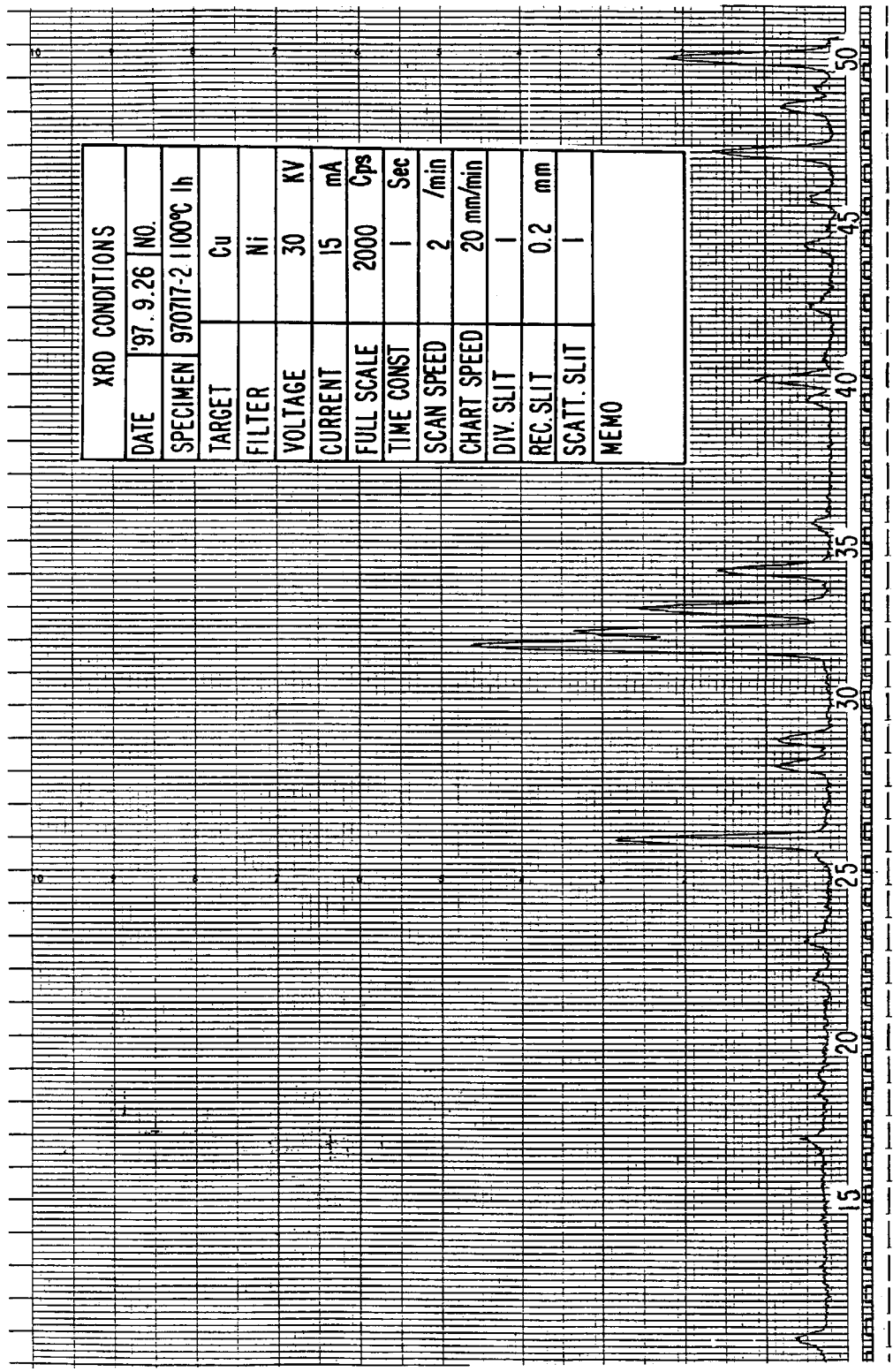
FIG. 4 is an X-ray diffraction pattern of hydroxyapatite fibers (Sample No. 1) obtained in Example 2.

FIG. 3 shows a SEM photograph of Sample No. 2, which indicates that the obtained hydroxyapatite is in the form of fibers. FIG. 4 shows the X-ray diffraction pattern of Sample No. 2, which indicates that the fibers are made of hydroxyapatite.

We claim:
1. A process for producing hydroxyapatite fibers comprising the steps of:
preparing a mixture of (1) calcium metaphosphate fibers and (2) calcium oxide, calcium hydroxide and/or calcium carbonate powder;

heating said mixture to convert said calcium metaphosphate to hydroxyapatite; and removing calcium oxide in the fibers by dissolving off from the resulting mixture, wherein said mixture contains between 2 to 4 parts by weight of said powder of calcium oxide, calcium hydroxide and/or calcium carbonate in terms of calcium oxide per one part by weight of said calcium metaphosphate fibers.

2. The process according to claim 1, wherein said mixture contains about 3 parts by weight of said powder of calcium oxide, calcium hydroxide and/or calcium carbonate in terms of calcium oxide per one part by weight of said calcium metaphosphate fibers.

3. The process according to claim 1, wherein said mixture is heated in the air at 800 to 1200° C. for not less than 1 hour.

4. The process according to claim 3, wherein said mixture is heated at about 1000° C. for about 1 hour.

5. The process according to claim 1, wherein said dissolving off of the calcium oxide in the heat-treated mixture is carried out by immersing the heated-treated mixture in water so as to react the calcium oxide with water to generate calcium hydroxide, and adding a reagent for dissolving calcium hydroxide to said water.

6. The process according to claim 5, wherein said reagent for dissolving off the calcium oxide in the heat-treated mixture is hydrochloric acid, acetic acid, nitric acid and/or ammonium chloride.

* * * * *